US009180978B2

(12) United States Patent
White et al.

(10) Patent No.: US 9,180,978 B2
(45) Date of Patent: Nov. 10, 2015

(54) SYSTEM AND METHOD FOR DEPARTURE METERING FROM AIRPORTS

(75) Inventors: Thomas White, Huntington, NY (US); Peter Gerlett, Long Beach, NY (US); Ron Dunsky, Brooklyn, NY (US)

(73) Assignee: PASSUR Aerospace, Inc., Stamford, CT (US)

( * ) Notice: Subject to any disclaimer, the term of this patent is extended or adjusted under 35 U.S.C. 154(b) by 0 days.

(21) Appl. No.: 13/184,124

(22) Filed: Jul. 15, 2011

(65) Prior Publication Data

US 2012/0221233 A1 Aug. 30, 2012

Related U.S. Application Data

(60) Provisional application No. 61/364,663, filed on Jul. 15, 2010, provisional application No. 61/383,803, filed on Sep. 17, 2010, provisional application No. 61/429,589, filed on Jan. 4, 2011.

(51) Int. Cl.
*B64F 1/00* (2006.01)
*G01C 21/20* (2006.01)

(52) U.S. Cl.
CPC ........................................ *B64F 1/00* (2013.01)

(58) Field of Classification Search
CPC ........ B64F 1/00; G01C 21/20; G08G 5/0043; G08G 5/00; G08G 5/0082; G08G 5/0026; G08G 5/065; G06Q 10/047; G06Q 50/30; G06Q 10/00; G06Q 30/00; G06F 3/0481
USPC ............... 701/120; 705/5, 6, 7.12, 7.15, 7.37, 705/7.38; 703/16; 370/252; 455/98, 456.1; 235/380, 385; 340/945, 978; 725/76, 725/116; 244/114 R; 709/223; 702/150; 324/300; 700/213
See application file for complete search history.

(56) References Cited

U.S. PATENT DOCUMENTS

| | | | |
|---|---|---|---|
| 6,282,487 B1 * | 8/2001 | Shiomi et al. | 701/120 |
| 6,789,011 B2 * | 9/2004 | Baiada et al. | 701/120 |
| 6,810,527 B1 * | 10/2004 | Conrad et al. | 725/76 |
| RE40,479 E * | 9/2008 | Wright et al. | 455/98 |
| 7,720,630 B1 * | 5/2010 | Miller et al. | 702/150 |
| 8,134,362 B1 * | 3/2012 | Hullender et al. | 324/300 |
| 2003/0225600 A1 * | 12/2003 | Slivka et al. | 705/5 |
| 2004/0054550 A1 * | 3/2004 | Cole et al. | 705/1 |
| 2005/0010460 A1 * | 1/2005 | Mizoguchi et al. | 705/7 |
| 2005/0065808 A1 * | 3/2005 | Faltings | 705/1 |
| 2005/0071206 A1 * | 3/2005 | Berge | 705/6 |
| 2006/0041651 A1 * | 2/2006 | Walcutt et al. | 709/223 |

(Continued)

*Primary Examiner* — Tuan C. To
*Assistant Examiner* — Yuri Kan
(74) *Attorney, Agent, or Firm* — Fay Kaplun & Marcin, LLP

(57) ABSTRACT

Described herein are systems and methods for allocating departure slots at an airport. One embodiment of the disclosure of this application is related to a method including calculating an estimated taxi time ("ETT") based on airport data and flight plan data, allocating a departure slot time for the first flight based on the ETT, and populating the allocated departure slot time in an allocation grid. Another embodiment of the disclosure of this application is related to a system comprising a user interface displaying information related to flight plan data and airport data received from an airport network, and a departure allocation processor calculating an estimated taxi time ("ETT") for the first flight based on the airport data and the flight plan data, allocating a departure slot time for the flight, and populating the departure slot time in an allocation grid via the user interface.

14 Claims, 3 Drawing Sheets

(56) References Cited

U.S. PATENT DOCUMENTS

| | | | |
|---|---|---|---|
| 2006/0095156 A1* | 5/2006 | Baiada et al. | 700/213 |
| 2006/0097046 A1* | 5/2006 | Baru Fassio et al. | 235/385 |
| 2006/0173609 A1* | 8/2006 | Green | 701/120 |
| 2008/0217475 A1* | 9/2008 | Allison | 244/114 R |
| 2009/0070841 A1* | 3/2009 | Buga et al. | 725/116 |
| 2009/0112645 A1* | 4/2009 | Jha et al. | 705/7 |
| 2009/0118997 A1* | 5/2009 | Truitt | 701/120 |
| 2010/0036596 A1* | 2/2010 | Dunsky | 701/120 |
| 2010/0042445 A1* | 2/2010 | Nicosia | 705/7 |
| 2010/0045485 A1* | 2/2010 | Dunsky | 340/945 |
| 2010/0078475 A1* | 4/2010 | Lin et al. | 235/380 |
| 2010/0190510 A1* | 7/2010 | Maranhas et al. | 455/456.1 |
| 2011/0199932 A1* | 8/2011 | Short et al. | 370/252 |
| 2011/0241902 A1* | 10/2011 | Shavit | 340/978 |
| 2011/0251781 A1* | 10/2011 | Brennan | 701/120 |
| 2012/0221233 A1* | 8/2012 | White et al. | 701/120 |

* cited by examiner

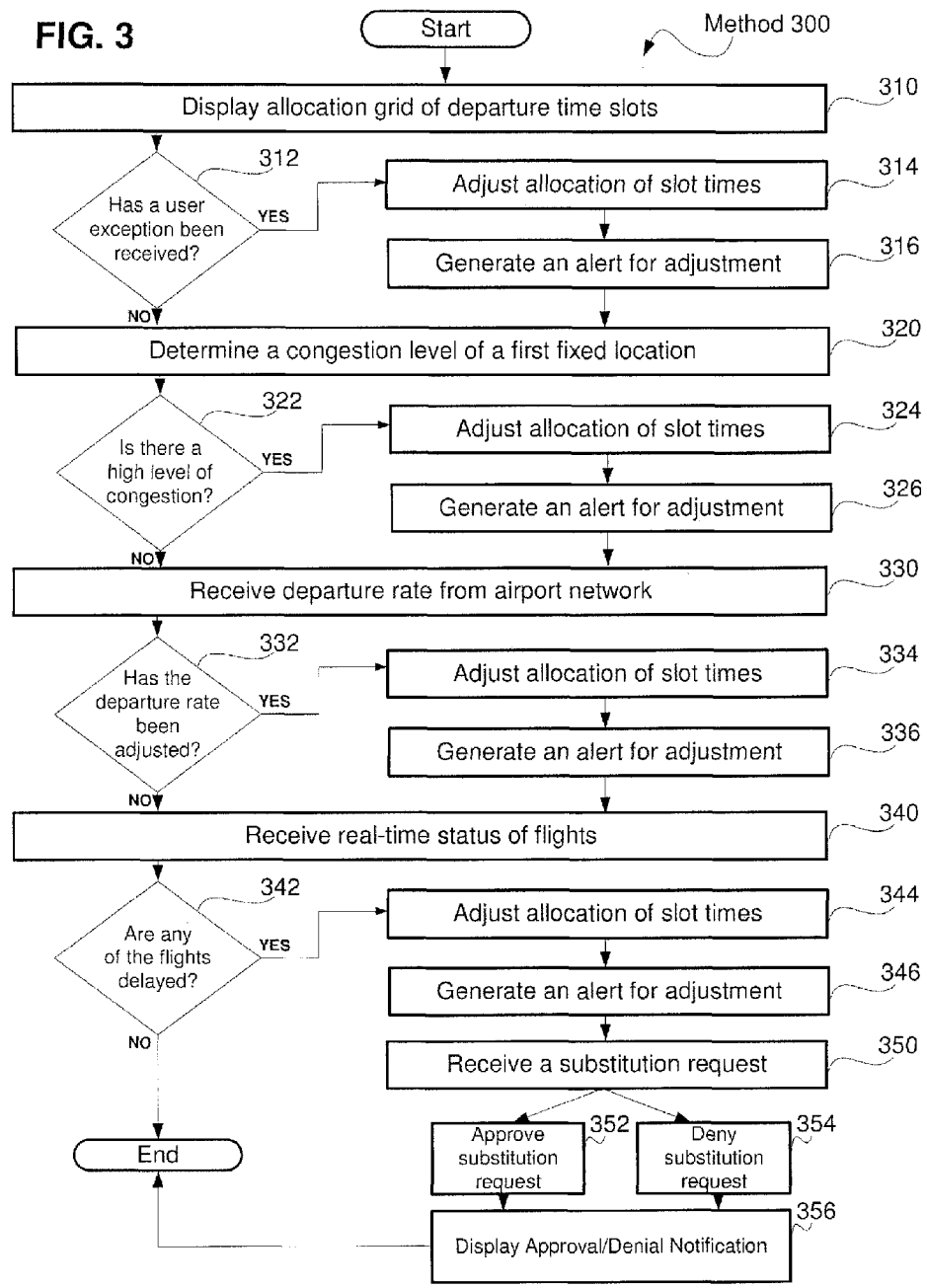

SYSTEM AND METHOD FOR DEPARTURE METERING FROM AIRPORTS

PRIORITY CLAIM/INCORPORATION BY REFERENCE

The present application claims priority to U.S. Provisional Patent Applications: 61/364,663 filed on Jul. 15, 2010 entitled "System and Method for Departure Sequencing at an Airport" naming Thomas White, Peter Gerlett, and Ron Dunsky as inventors; 61/383,803 filed on Sep. 17, 2010 entitled "System and Method for Departure Metering" naming James Cole, Robert Damis, Ron Dunsky and Thomas White as inventors; and 61/429,589 filed on Jan. 4, 2011 entitled "System and Method for Departure Metering" naming James Cole, Robert Damis, Ron Dunsky and Thomas White as inventors; and hereby incorporates, by reference, the entire subject matter of these Provisional Applications.

BACKGROUND

Traditionally, airport departures are managed on a first come, first serve basis. For instance, aircraft are taxied out and get in line in order to be sequenced for takeoff. However, when runway demand exceeds an airport's capacity, the result can be long departure queues, surface congestion, gate hold-outs, as well as aircraft gridlock that results in ground stops and arrival delays and the threat of Tarmac Delay Department of Transportation fines. Furthermore, these delays caused by inefficient allocation of departures times can lead to increased fuel usage, increased fuel load and increased air emissions while diminishing the overall passenger experience.

SUMMARY OF THE INVENTION

Described herein are systems and methods for allocating departure slots at an airport. One embodiment of the disclosure of this application is related to a method including receiving airport data from an airport network, receiving flight plan data of a first flight from the airport network, calculating an estimated taxi time ("ETT") based on the airport data and the flight plan data, allocating a departure slot time for the first flight based on the ETT, and populating the allocated departure slot time in an allocation grid.

Another embodiment of the disclosure of this application is related to a system comprising a user interface displaying information related to flight plan data and airport data received from an airport network, and a departure allocation processor receiving the airport data and the flight plan data of a first flight from the airport network, calculating an estimated taxi time ("ETT") for the first flight based on the airport data and the flight plan data, allocating a departure slot time for the first flight based on the ETT, and populating the allocated departure slot time in an allocation grid via the user interface.

A further embodiment of the disclosure of this application is related to a non-transitory computer readable storage medium including a set of instructions for allocating departure slots, executable by a processor. Specifically, the set of instructions to receive airport data, receive flight plan data of a first flight, calculate an estimated taxi time ("ETT") based on the airport data and the flight plan data, allocate a departure slot time for the first flight based on the ETT, and populate the allocated departure slot time in an allocation grid.

DESCRIPTION OF THE DRAWINGS

FIG. 3 shows an exemplary method for determining and adjusting departure slot times during departure metering from an airport according to an exemplary embodiment of the present invention.

DETAILED DESCRIPTION

Figure 1:
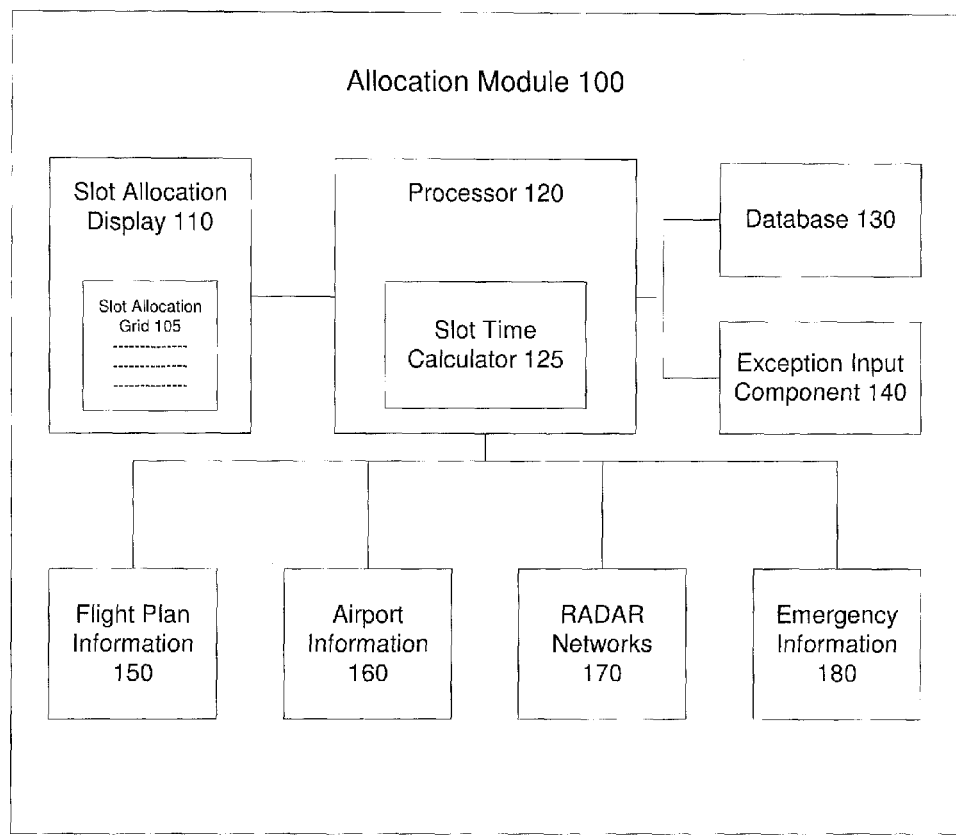
FIG. 1 shows an exemplary system for departure metering from an airport according to an exemplary embodiment of the present invention.

The exemplary embodiments may be further understood with reference to the following description and the appended drawings, wherein like elements are referred to with the same reference numerals. The exemplary embodiments describe systems and methods for efficiently allocating departure slots at an airport.

As will be described in detail below, the exemplary systems and methods described herein may enhance an airport's ability to manage aircraft departures during peak operating times, bad weather, construction projects, or any other occasion where demand exceeds airport capacity. Specifically, the systems and methods may allocate departure sequencing through the use of various sources of information and resources, such as surveillance data, air traffic management software, and professional services. Accordingly, these systems and methods described herein may reduce airline fuel costs and emissions, and minimize taxi/tarmac delays.

As will be described in greater detail below, the exemplary systems and methods for allocating departure slots may utilize a user interface to provide a user with departure slot times and the aircraft to which these slots have been allocated. For instance, the user interface may be a slot allocation display providing the user with a grid-type display of relevant information. Specifically, the exemplary slot allocation display may be supplied with flight information, such as flight plans, as well as any manual changes, such as exception and/or emergency information. Accordingly, the slot allocation display may enhance the overall efficiency of departure sequencing at an airport through automated slot management.

FIG. 1 shows an exemplary allocation module 100 for departure metering from an airport according to an exemplary embodiment. The allocation module 100 may include a user interface, such as a slot allocation display 110, a processor 120, a database 130, and an exceptions input component 140. In addition, the allocation module 100 may be in communication with any number of airport network information sources, such as, but not limited to flight plan information 150, airport facilities information 160, radar networks 170, and emergency information 180. In addition, the airport network information sources may also include any data entered manually by a user It should be noted that the communication between the database 130 and the various other components of the module 100 may be secured communications. In other words, the information transfer to and from the database 130 may be filtered using any number of encryption methods, authentication/verification systems, security protocols, etc.

According to the exemplary embodiments, the allocation module 100 may provide automatic population of aircraft departure slots using the received flight plan information 150. Those skilled in the art would understand that each aircraft and airline files a flight plan with the Federal Aviation Administration ("FAA") for each flight. The flight plan information 150 may include a scheduled takeoff time (e.g., wheels up time). Upon receiving the flight plan information 150 for a specific aircraft, the processor 120 may calculate an estimated taxi time ("ETT") for that aircraft. For instance, the ETT may be based on the airport information 160, such as gate assignments, runway usage, etc.

Using the ETT calculated from the flight plan information 150 and the airport information 160, the exemplary allocation module 100 may automatically assign a departure slot for the aircraft. The assigned departure slot may be displayed to the user via the slot allocation display 110. Accordingly, airlines and departure metering center teams may manage the initial allocations of departure slots more efficiently. Specifically, the airlines do not have to make manual requests for departure slots since the allocation module 100 determines the initial slots based on the flight plan information 150 and the calculated ETT. In addition, the metering center teams do not have to manually assign these initial departure slots. Thus, the only manual operation may be addressing user-generated changes by exceptions.

According to an additional feature of the exemplary embodiments, the allocation module 100 may also provide automatic population of first fix information using the received flight plan information 150. Those skilled in the art would understand that a first fix may be considered a gate in the sky through which an aircraft is routed. Accordingly, for each aircraft, first fix information may be included in the flight plan information 150 provided to the allocation module 100 and displayed to the user via the slot allocation display 110. The allocation module 100 and/or the user (e.g., departure metering center team) may determine if a particular first fix location is crowded and adjust departure sequencing. In other words, a aircraft having a different first fix location may be sequenced for departure earlier than an aircraft destined for the crowded first fix location to alleviate congestion.

For example, the aircraft may be sequenced to a remote location after leaving the gate. The user (e.g., metering personnel) may see the first fix information on the slot allocation display 110 for all of the aircraft in this remote location and sequence those aircraft for departure that do not have a congested first fix location. Therefore, the user is able to more efficiently use the airport's runways, airspace and departure slots.

According to a further feature of the exemplary embodiments, the allocation module 100 may quickly provide the user with taxi times of aircraft using the slot allocation display 110. Specifically, the allocation module 100 may include an auto-reveal feature that displays a specific taxi time when the user "mouses over" or "hovers" a mouse pointer over a specific aircraft listed on the slot allocation display 110.

For example, the user may use a mouse pointer to scroll over an aircraft in a departure slot in the display 110, and the scroll over may automatically display the planned taxi time for the aircraft in a pop-up window on the display 110. Accordingly, this feature allows for instant visibility of planned taxi times, which is a primary consideration in the reallocation of slot times. Thus, the user is provided with a much quicker and more efficient system for the reallocation of departure slots when operational considerations require changes in previous slot allocations. In addition, instant access to both planned taxi time and slot time on the same display 110 allows the user to make quick reassessments of current delays.

According to a further feature of the exemplary embodiments, the allocation module 100 may provide automatic alerts to the user when an allocated time slot for an aircraft has been changed or canceled. Specifically, the slot allocation display 110 may display an automated alert to an airline, a departure metering center team, etc. The alert may be in the form of a pop-up window or new page on the slot allocation display 110. Regardless of whichever screen or page the user is browsing in the display 110, the alert may interrupt the browsing and direct the user as to how to easily find new information related to the alert.

Furthermore, the alert may provide online acknowledgement to the slot allocators, thereby allow the allocators to confirm that the change has been noted by the user. Ordinarily, such adjustments to slot times and acknowledgements would require a lengthy verbal communication. However, the exemplary alert feature of the allocation module 100 allows for changes to slot times and user acknowledgement of changes to be accomplished quickly and within the screen of the slot allocation display 110.

According to a further feature of the exemplary embodiments, the allocation module 100 may provide additional automated departure slot allocation. Specifically, the processor 120 of the exemplary allocation module 100 may utilize a slot time calculator 125 to perform automatic slot allocation. For instance, the slot time calculator 125 may receive a departure rate as an input and generate proportional allocations of slot times. Using the departure rate in conjunction with proportional allocations, the slot time calculator 125 may automatically populate slot allocations for a pre-determined time frame (e.g., the next two hours) into a "departure slot allocation manager" page on the display 110.

According to one example, a departure capacity may be reduced due to an airport condition (e.g., severe weather) for the next two hours. Based on the reduced departure rate, the slot time calculator 125 may proportionally reduce the slots times during the time period. For instance, if the departure rate is reduced in half, the slot time calculator 125 may automatically reduce the departure slots in half during the time frame and repopulate the allocation grid 105 accordingly (e.g., if an airline had 14 scheduled departure slots and the departure rate was reduced by 50%, the airline would be allocated only 7 departure slots based on the reduced departure rate). Furthermore, the slot time calculator 125 may automatically roll-over the remaining flights into future time slots. It should be noted that other non-proportional methods may also be used to adjust the departure slot times.

As described above, the slot time calculator 125 may use the flight plan information 150 to determine initial allocations of departure slot times. The calculator 125 may then use manual data (e.g., user-generated exceptions) and/or other changes to reallocate departure slot times during operation. This may effectively transform the initial slot allocation into a single-entry, one-stop process. As opposed to manually selecting flights from each airline, or pool of airlines, to meet their allocation requirements, the exemplary allocation module 100 eliminates this labor-intensive process while reducing the probability of misallocations.

According to a further feature of the exemplary embodiments, the allocation module 100 may include automated integration of planned taxi time into appropriate areas on other airport systems and networks, such as an irregular operations application (e.g., PASSUR OPSnet provided by PASSUR Aerospace, Inc. of Stamford, Conn.). Specifically, flight information from the slot allocation grid 105 as well as first departure fix for to individual flights may be provided to these airport systems and networks.

While in communication with the allocation module 100, the exemplary radar network 170 may provide data tracking systems, such as an arrival management system and an air traffic management system. An exemplary arrival management system (or ETA System) may include algorithms for providing accurate arrival predictions, and thus ensuring timely and accurate reporting of detailed aircraft information to entities such as governmental agencies for deployment of interdiction teams. An exemplary air traffic management system may track flights and monitor airspace conditions, as well as provide live airspace surveillance of visual flight rules ("VFR") and instrument flight rules ("IFR"). Those skilled in the art will understand that VFR are a set of regulations which allow a pilot to operate an aircraft in weather conditions generally clear enough to allow the pilot to see where the aircraft is going, and that IFR are regulations and procedures for flying aircraft by referring only to the aircraft instrument panel for navigation.

The radar network 170 may monitor flight patterns while tracking VFR and IFR of an aircraft and determine the status of a flight in real-time. Furthermore, the various systems of the exemplary radar network 170 may receive and correlate tracking information from aviation data sets and air traffic monitoring sources, such as, automatic dependent surveillance-broadcast ("ADS-B") components, aircraft communications addressing and reporting system ("ACARS") components, and airport surface detection equipment ("ASDE-X") components.

Those skilled in the art will understand that the ADS-B components may provide accurate information and frequent updates to airspace users and controllers, and thus may support improved use of airspace, such as reduced ceiling/visibility restrictions, improved surface surveillance, and enhanced safety, for example through conflict management. An aircraft in communication with the ADS-B components may determine its own position using a global navigation satellite system and then periodically may broadcast this position and other relevant information to potential ground stations and other aircrafts within the system. The ADS-B components may be used over several different data link technologies, including Mode-S Extended Squitter ("1090 ES") operating at 1090 MHz, Universal Access Transceiver ("978 MHz UAT"), and VHF data link ("VDL Mode 4").

Those skilled in the art will understand that the ACARS components may be defined as a digital data-link system for the transmission of short messages between an aircraft and the ground stations via radio or satellite transmission. In addition, those skilled in the art will understand that the ASDE-X components may be defined as a runway-safety tool that enables air traffic controllers to detect potential runway conflicts through providing detailed coverage of vehicle/aircraft movement on runways, taxiways, etc. Specifically, by collecting data from a variety of sources, the ASDE-X components are able to track vehicles and aircraft on airport surfaces and obtain identification information from aircraft transponders.

According to the exemplary embodiments of the allocation module 100, the airport network information sources may include sources relaying airport field conditions, en route radar information, flight plan data, and operator data. Therefore, these airport information sources may allow the allocation module 100 to instantly identify aircraft information (e.g., tail number, owner, operator, aircraft registration and specification data) in order to create a detailed and accurate departure allocation grid 105 including operator/aircraft profiles.

Figure 2:
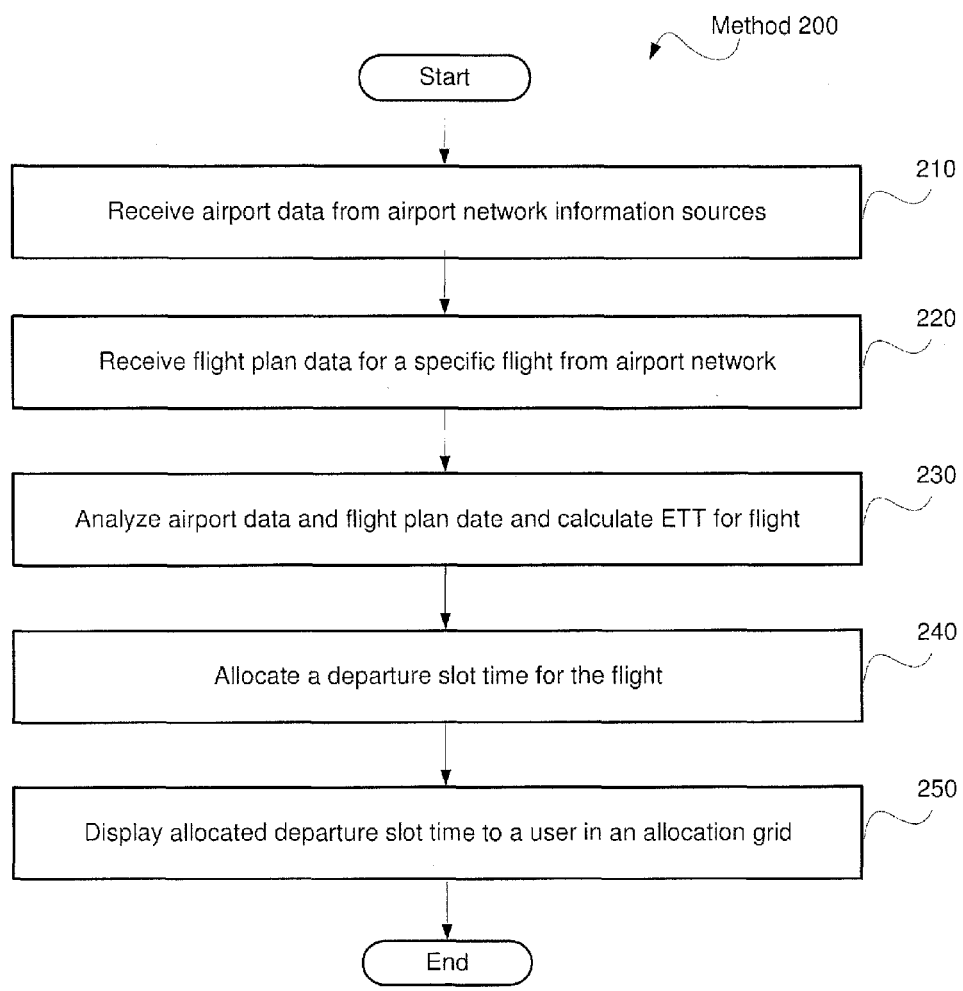
FIG. 2 shows an exemplary method for departure metering from an airport according to an exemplary embodiment of the present invention.

FIG. 2 shows an exemplary method for departure metering from an airport according to an exemplary embodiment of the present invention. It should be noted that the steps the exemplary method 200 may be performed by the various components of the system described in FIG. 1, such as the departure allocation module 100.

It should be noted that the exemplary allocation module performing the steps of method 200 described herein may be incorporated into an existing system. For example, the flight-allocation module may be a web-based communication system, such as a live allocation portal, in which a menu may be presented and an option may be available to access both historical flight information as well as currently tracked flight information. Accordingly, it should be noted that the steps of method 200 may be performed by a processor of a computer system (e.g., a departure allocation processor), wherein the steps are provide to the processor as a set of software instructions stored on a non-transitory computer-readable medium, such as a computer memory.

In step 210 of the method 200, the allocation module 100 may receive airport data from the airport network information sources. This information may include, but is not limited to, ETAs of specific inbound aircraft, status of arrival and departure fixes, status of runways, status of ground queues, forecasts of arrival and departure rates, airline departure demand by flight, sequencing (e.g., "virtual queuing") by fix, etc. Accordingly, this information may be used by the allocation module 100 to manage the departure slots.

In step 220 of the method 200, the allocation module 100 may receive flight plan data 150 for a specific flight from the airport network information sources. The allocation module 100 may coordinate with airport manager for each of the specific flights and runway assignments. This information may also include runway configurations and any taxiway closures that effect metering locations and/or access to metering locations. Furthermore, this information may include aircraft restrictions and suitability for each runway. For instance, specific runways and taxi routes may only be suitable for aircraft of a specific size or weight.

In step 230, the allocation module 100 may analyze the airport data and the flight plan data and calculate an ETT. For instance, an airline may submit a request for a metering location (e.g., via a user interface such as a chat function). The metering location may be assigned based on the analysis of the allocation module 100, while taking in to account factors such as slot time order, first fixed location information, manual exception information, delayed status of flight, slot substitution ("swap") requests, etc.

In step 240, the allocation module 100 may allocate a departure slot time for the flight. Accordingly, an airline ramp tower may now advise the flight's pilot to request a departure taxi. Once the aircraft has been released and cleared of the metering location, the allocation module 100 may repeat the method 200 for a further aircraft, thereby assigning a metering location to this aircraft upon a request for metering.

In step 250, the allocation module 100 may display the allocated departure slot time for the flight in an allocation grid 105 via a user interface. According to one embodiment, the method 200 may provide instant communication to various outlets and terminals via a user interface (e.g., a web-enabled dashboard including an allocation portal). This web-enabled dashboard may allow the allocation module 100 to securely coordinate and collaborate with external entities such as specific airlines and governmental agencies (e.g., DEA operatives) in real-time.

FIG. 3 shows an exemplary method 300 for determining and adjusting departure slot times during departure metering from an airport according to an exemplary embodiment of the present invention. It should be noted that the steps of the exemplary method 300 may be performed by the various components described in FIG. 1, such as the allocation module 100. Furthermore, the exemplary method 300 may be performed at any time following the allocation of a specific flight's departure slot time in step 240 of method 200.

In step 310 of the method 200, the allocation module 100 may display the allocation of departure slot times for a plurality of flights in an allocation grid.

In step 312, the allocation module 100 may determine whether a manual exception has been received from a user. If an exception is received for a specific flight, or group of flights, has been received, the allocation module 100 may adjust the departure slot times in step 314 and generate an alert to inform the user of the change in step 316. If an exception has not been received, the method 300 may advance to step 320.

In step 320 of the method 200, the allocation module 100 may determine a congestion level of a first fix location based on information provided by the airport network information sources. As noted above, the airport network information sources may include data entered manually by the user. Therefore, the determined congestion level may be based on user input.

In step 322, the allocation module 100 may determine whether the congestion level is above a predetermined threshold (e.g., a first fix location having a high level of congestion). If the congestion level is too high, the allocation module 100 may adjust the departure slot times in step 324 and generate an alert to inform the user of the change in step 326. If the congestion level is below the threshold, the method 300 may advance to step 330.

In step 330 of the method 200, the allocation module 100 may receive a departure rate from the airport network information sources.

In step 332, the allocation module 100 may determine whether the departure rate has been adjusted (e.g., the departure rate is reduced by 50% due to inclement weather). If the departure rate is adjusted, the allocation module 100 may adjust the departure slot times accordingly in step 334 and generate an alert to inform the user of the change in step 336. If the departure rate has not been adjusted, the method 300 may advance to step 340.

In step 340 of the method 200, the allocation module 100 may receive a real-time status update for the plurality of flights. Specifically, the allocation module 100 may receive radar data and current flight data (e.g., "live" flight data) from an integrated radar network, such as the radar network 170 described in FIG. 1. As described above, an exemplary radar network may include a plurality of radar installations covering numerous domestic and international airports and terminal airspaces. The radar network may feature the ability to track any aircraft with a working transponder.

In step 342, the allocation module 100 may determine whether a specific flight will be delayed. If the departure of a flight will be delayed, the allocation module 100 may reallocate the departure slot times accordingly in step 344 and generate an alert to inform the user of the change in step 346. If there is no delay to the flight, the allocation module 100 may maintain the original allocation.

Furthermore, in step 350, the allocation module 100 may receive a swap request from an airline based on the delayed flight. The allocation module 100 may determine whether the swap request will be approved or denied. If approved, in step 352, the allocation module 100 may substitute the delayed flight with a further flight. If denied, in step 354, the allocation module 100 may reject the swap request. Furthermore, in step 356, the allocation module 100 may display either an approval message including substitution information or a denial message including denial description to the user via a user interface (e.g., a web-based dashboard).

The exemplary user interface of the exemplary allocation module 100 may be easily implemented in existing systems to further incorporate the above described advantages for real-time information gathering and alerting of passengers/airport personnel as well as providing back data of alerts to prepare for future anticipated alerts.

Those skilled in the art will understand that the above-described exemplary embodiments may be implemented in any number of manners, including as a separate software module, as a combination of hardware and software, etc. For example, the exemplary departure allocation module may be a program containing lines of code that, when compiled, may be executed on a processor. Specifically, the allocation module may be a program of a server for a network in which data relating to allocation flight departures is stored in a database of the network.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, including:
   receiving, by an allocation processor, airport data from an airport network;
   receiving, by the allocation processor, flight plan data of a first flight from the airport network;
   calculating, by the allocation processor, an estimated taxi time ("ETT") based on the airport data and the flight plan data, the ETT being an estimated time when the first flight will begin taxiing;
   allocating, by the allocation processor, a departure slot time for the first flight based on the ETT calculated by the processor;
   populating, by the allocation processor, the allocated departure slot time in an allocation grid;
   receiving, by the allocation processor, an adjusted departure rate over a predetermined period of time;
   proportionally adjusting, by the allocation processor, a plurality of departure slot times during the predetermined period of time based on the adjusted departure rate;
   re-populating, by the allocation processor, the allocation grid based on the adjusted departure rate;
   receiving, by the allocation processor, first fix data for a location from the airport network;
   identifying, by the allocation processor, a congestion level of the location based on the first fix data;
   reallocating, by the allocation processor, the departure slot time for the first flight when the congestion level at the location having the first fix data is over exceeds a predetermined threshold; and
   re-populating, by the allocation processor, the reallocated departure slot in the allocation grid.

2. The method of claim 1, further including:
   receiving, by the allocation processor, an exception from a user; and
   adjusting the calculated ETT based on the exception.

3. The method of claim 1, further including:
   providing, by the allocation processor, an alert to a user based on the reallocated departure slot.

4. The method of claim 1, further including:
   receiving, by the allocation processor, a delay notification for the first flight including a delay time;
   displaying, by the allocation processor, a total number of minutes for the delay time to the user;
   calculating, by the allocation processor, a further ETT for at least one further flight based on removing the first flight from the allocation grid;

reallocating, by the allocation processor, departure slot times for the at least one further flight; and re-populating, by the allocation processor, an adjusted allocation grid including the reallocated departure slot times of the further flight and a removal of the first flight.

5. The method of claim 4, further including:

receiving, by the allocation processor, a swap request between the first flight and the at least one further flight;

determining, by the allocation processor, one of an approval and a denial of the swap request based on airport regulations;

substituting, by the allocation processor, the first flight with the at least one further flight upon approval of the swap request;

rejecting, by the allocation processor, the swap request upon denial of the swap request; and displaying, by the allocation processor, one of an approval message including substitution information and a denial message including denial description to the user.

6. A system, comprising:

a user interface displaying information related to flight plan data and airport data received from an airport network; and a departure allocation processor receiving the airport data and the flight plan data of a first flight from the airport network, calculating an estimated taxi time ("ETT") for the first flight based on the airport data and the flight plan data, the ETT being an estimated time when the first flight will begin taxiing, allocating a departure slot time for the first flight based on the ETT calculated by the departure allocation processor, populating the allocated departure slot time in an allocation grid via the user interface, receiving an adjusted departure rate over a predetermined period of time, proportionally adjusting a plurality of departure slot times during the predetermined period of time based on the adjusted departure rate, re-populating the allocation grid based on the adjusted departure rate, receiving first fix data from a location, identifying a congestion level of the location based on the first fix data, reallocating the departure slot time for the first flight when the congestion level at the location having the first fix data exceeds a predetermined threshold, and re-populating the reallocated departure slot in the allocation grid via the user interface.

7. The system of claim 6, wherein the departure allocation processor receives an exception from a user via the user interface and adjusts the calculated ETT based on the exception.

8. The system of claim 6, wherein the departure allocation processor provides an alert via the user interface based on the reallocated departure slot.

9. The system of claim 6, wherein the departure allocation processor further receives a delay notification for the first flight including a delay time, displays a total number of minutes for the delay time via the user interface, calculates a further ETT for at least one further flight based on removing the first flight from the allocation grid, reallocates departure slot times for the at least one further flight, and re-populates an adjusted allocation grid including the reallocated departure slot times of the further flight and a removal of the first flight.

10. The system of claim 9, wherein the departure allocation processor further receives a swap request between the first flight and the at least one further flight, determines one of an approval and a denial of the swap request based on airport regulations, substitutes the first flight with the at least one further flight upon approval of the swap request, rejects the swap request upon denial of the swap request, and displays to the user one of an approval message including substitution information and a denial message including a denial description via the user interface.

11. A non-transitory computer readable storage medium including a set of instructions executable by a processor, the set of instructions, when executed, causing the processor to perform operations, comprising:

receiving airport data; receive flight plan data of a first flight;

calculating an estimated taxi time ("ETT") based on the airport data and the flight plan data, the ETT being an estimated time when the first flight will begin taxiing;

allocating a departure slot time for the first flight based on the calculated ETT;

populating the allocated departure slot time in an allocation grid;

receiving an adjusted departure rate over a predetermined period of time;

proportionally adjusting a plurality of departure slot times during the predetermined period of time based on the adjusted departure rate;

re-populating the allocation grid based on the adjusted departure rate;

receiving first fix data from a location;

identifying a congestion level of the location based on the first fix data;

reallocating the departure slot time for the first flight when the congestion level at the location having the first fix data exceeds a predetermined threshold;

re-populating the reallocated departure slot in the allocation grid; and providing an alert to a user based on the reallocated departure slot.

12. The non-transitory computer readable storage medium of claim 11, wherein the operations further comprise:

receiving an exception from a user; and adjusting the calculated ETT based on the exception.

13. The non-transitory computer readable storage medium of claim 11, wherein the operations further comprise:

receiving a delay notification for the first flight including a delay time;

displaying a total number of minutes for the delay time to the user;

calculating a further ETT for at least one further flight based on removing the first flight from the allocation grid;

reallocating departure slot times for the at least one further flight; and re-populating an adjusted allocation grid including the reallocated departure slot times of the further flight and a removal of the first flight.

14. The non-transitory computer readable storage medium of claim 13, wherein the operations further comprise:

receiving a swap request between the first flight and the at least one further flight;

determining one of an approval and a denial of the swap request based on airport regulations;

substituting the first flight with the at least one further flight upon approval of the swap request;

rejecting the swap request upon denial of the swap request; and displaying one of an approval message including substitution information and a denial message including a denial description via the user interface.

* * * * *

UNITED STATES PATENT AND TRADEMARK OFFICE
CERTIFICATE OF CORRECTION

PATENT NO. : 9,180,978 B2  
APPLICATION NO. : 13/184124  
DATED : November 10, 2015  
INVENTOR(S) : White et al.

Page 1 of 1

It is certified that error appears in the above-identified patent and that said Letters Patent is hereby corrected as shown below:

In The Claims

Claim 1, Column 8, Line 49:

"location having the first six data is over exceeds a predetermined threshold" should read "location having the first fix data exceeds a predetermined threshold"

Signed and Sealed this  
Twelfth Day of April, 2016

Michelle K. Lee  
*Director of the United States Patent and Trademark Office*